(12) United States Patent
Okazaki et al.

(10) Patent No.: US 12,042,963 B2
(45) Date of Patent: Jul. 23, 2024

(54) MOLDED ARTICLE AND METHOD OF PRODUCING THE SAME

(71) Applicant: SUMITOMO CHEMICAL COMPANY, LIMITED, Tokyo (JP)

(72) Inventors: Ryosuke Okazaki, Ehime (JP); Makoto Manabe, Ehime (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 187 days.

(21) Appl. No.: 17/512,747

(22) Filed: Oct. 28, 2021

(65) Prior Publication Data

US 2022/0134612 A1    May 5, 2022

(30) Foreign Application Priority Data

Oct. 30, 2020 (JP) ................................ 2020-183109

(51) Int. Cl.
  *B29C 45/00* (2006.01)
  *B29K 33/00* (2006.01)
  (Continued)

(52) U.S. Cl.
  CPC .......... *B29C 45/0001* (2013.01); *C08L 33/10* (2013.01); *B29K 2033/12* (2013.01);
  (Continued)

(58) Field of Classification Search
  CPC ........ C08L 33/10; C08L 33/12; C08F 220/14; B29K 2033/12; B29K 2995/007
  See application file for complete search history.

(56) References Cited

U.S. PATENT DOCUMENTS 11,851,558 B2 * 12/2023 Okazaki ................ C08F 265/06
2012/0196127 A1    8/2012 Murakami
(Continued)

FOREIGN PATENT DOCUMENTS

AU        496034 B2    12/1976
EP       1174259 A1    1/2002
(Continued)

OTHER PUBLICATIONS

Extended European Search Report issued on Jan. 28, 2022 in European Patent Application No. 21194313.9, 9 pages.

*Primary Examiner* — Kregg T Brooks
*Assistant Examiner* — David R. Foss
(74) *Attorney, Agent, or Firm* — Meunier Carlin & Curfman LLC

(57) ABSTRACT

Provided are a molded article excellent in a Charpy impact strength and a method of producing the same. A molded article contains a methacrylic resin composition containing at least one methacrylic resin, in which a pencil hardness is 2 H or higher, and a craze formation time is 19 seconds or longer, the craze formation time being measured by sequentially performing the following steps 1) to 5):

1) preparing a test piece that is a strip-shaped molded article, the test piece having a through-hole provided on one end side in a longitudinal direction;
2) heating and drying the test piece;
3) clamping the other end side of the test piece in the longitudinal direction and fixing the test piece to a fixing table so that extending directions of an upper surface and a lower surface of the test piece coincide with a horizontal direction;
4) applying ethanol one or more times to a predetermined region of the upper surface while generating a surface stress on the upper surface by applying a load calculated by a specific equation in a vertical direction at a (Continued)

position where the through-hole of the test piece is provided, and maintaining a state in which the ethanol is applied; and 5) obtaining the craze formation time by measuring a time from the start of the application of the ethanol to the formation of the craze in the test piece.

10 Claims, 3 Drawing Sheets

(51) Int. Cl.
*C08F 220/14* (2006.01)
*C08L 33/10* (2006.01)
*C08L 33/12* (2006.01)

(52) U.S. Cl.
CPC ...... *B29K 2995/007* (2013.01); *C08F 220/14* (2013.01); *C08L 33/12* (2013.01)

(56) References Cited

U.S. PATENT DOCUMENTS

| | | | |
|---|---|---|---|
| 2015/0299360 | A1* | 10/2015 | Murakami ............ F21S 43/26 525/205 |
| 2016/0185884 | A1 | 6/2016 | Yamamori et al. |
| 2017/0190896 | A1 | 7/2017 | Yamamori et al. |
| 2020/0172646 | A1 | 6/2020 | Okazaki et al. |
| 2021/0301120 | A1 | 9/2021 | Okazaki et al. |

FOREIGN PATENT DOCUMENTS

| | | |
|---|---|---|
| EP | 2457950 A1 | 5/2012 |
| JP | 2011-105810 A | 6/2011 |
| JP | 2013-32509 A | 2/2013 |
| JP | 2016-8237 A | 1/2016 |
| JP | 2021-155698 A | 10/2021 |
| WO | 2007/004670 A1 | 1/2007 |
| WO | 2011/093222 A1 | 8/2011 |
| WO | 2014/088082 A1 | 6/2014 |
| WO | 2017/146169 A1 | 8/2017 |
| WO | 2018/066393 A1 | 4/2018 |
| WO | 2018/221580 A1 | 12/2018 |

* cited by examiner

MOLDED ARTICLE AND METHOD OF PRODUCING THE SAME

CROSS-REFERENCE TO RELATED APPLICATIONS

The present disclosure is the U.S. Application, which claims benefit of Japanese Patent Application No. 2020-183109, filed with the Japanese Patent Office on Oct. 30, 2020, the content of which is incorporated herein by reference in its whole entirety.

BACKGROUND OF THE INVENTION

Field of the Invention

The present invention relates to a molded article and a method of producing the same, and more particularly, to a molded article formed of a methacrylic resin composition and a method of producing the same.

Description of the Related Art

The methacrylic resin composition is excellent in transparency and heat resistance. Therefore, as a material substituted for inorganic glass, for example, a methacrylic resin composition used as a material of an automobile member such as a cover of a tail lamp or a head lamp, and having various characteristics has been developed.

For example, JP-A-2016-008237 discloses a methacrylic resin composition used as a material of an automobile member. It is described that the methacrylic resin composition according to JP-A-2016-008237 contains two methacrylic resins having different peak molecular weights, and satisfies a predetermined condition.

SUMMARY OF THE INVENTION

In recent years, weight reduction of members constituting a vehicle such as an automobile has been required particularly from the viewpoint of improving fuel efficiency. Therefore, it is preferable that a member for a vehicle, particularly, a molded article formed of a methacrylic resin composition is thin. In addition, in accordance with design requirements and the like, a molded article formed of a methacrylic resin composition, which is a vehicle member, may be produced as a large member. However, as the molded article becomes thinner and larger, an impact strength thereof tends to be decreased.

Therefore, there is a demand for a molded article formed of a methacrylic resin composition capable of producing a molded article having a desired level of an impact strength, and a method of producing the same.

However, in a case where the methacrylic resin composition according to the related art is used for a molded article, a Charpy impact strength of the molded article is not sufficient.

Therefore, a molded article excellent in a Charpy impact strength and a method of producing the same are required.

As a result of conducting intensive studies to solve the above problems, the present inventors found that the above problems can be solved by a molded article formed of a methacrylic resin composition satisfying a predetermined requirement and a method of producing the same, thereby completing the present invention. That is, the present invention provides the following (1) to [12].

[1] A molded article containing a methacrylic resin composition containing at least one methacrylic resin,
in which a pencil hardness is 2 H or higher, and
a craze formation time is 19 seconds or longer, the craze formation time being measured by sequentially performing the following steps 1) to 5):
1) preparing a test piece that is a strip-shaped molded article, the test piece having a through-hole provided on one end side in a longitudinal direction;
2) heating and drying the test piece;
3) clamping the other end side of the test piece in the longitudinal direction and fixing the test piece to a fixing table so that extending directions of an upper surface and a lower surface of the test piece coincide with a horizontal direction;
4) applying ethanol one or more times to a predetermined region of the upper surface while generating a surface stress on the upper surface by applying a load calculated by the following Equation (1) in a vertical direction at a position where the through-hole of the test piece is provided, and maintaining a state in which the ethanol is applied, $$Wt = (1{,}785 \times W \times T_1^2)/(6 \times L_3) \qquad (1)$$

wherein,
Wt represents the load (g) applied in the vertical direction at the position where the through-hole of the test piece is provided,
W represents a length (mm) of the test piece in a transverse direction,
$T_1$ represents a length (mm) of the test piece in a thickness direction, and
$L_3$ represents a distance (mm) between a central axis of the through-hole of the test piece and the center of the predetermined region of the test piece to which the ethanol is applied; and
5) obtaining the craze formation time by measuring a time from the start of the application of the ethanol to the formation of the craze in the test piece.

[2] The molded article according to (1), in which the pencil hardness is 2 H or 3 H.

[3] The molded article according to [1] or [2], in which the craze formation time is 19 seconds or longer and 54 seconds or shorter.

[4] The molded article according to any one of [1] to [3], in which the methacrylic resin composition satisfies the following requirements (i) to (iii):
(W) W1 is 10 to 25, in which W1 is a ratio (%) of a peak area from a starting point to a molecular weight of 30,000 to a peak area from the starting point to an end point in a differential molecular weight distribution curve of the methacrylic resin composition;
(ii) W2 is 5 to 35, in which W2 is a ratio (i) of a peak area from a molecular weight of 300,000 to the end point to the peak area from the starting point to the end point in the differential molecular weight distribution curve of the methacrylic resin composition; and
(iii) a ratio (Mw/Mn) of a mass average molecular weight of the methacrylic resin composition to a number average molecular weight of the methacrylic resin composition is 2.0 to 6.0.

[5] The molded article according to any one of [1] to [4], in which the methacrylic resin composition contains two methacrylic resins.

[6] The molded article according to [5],
in which the two methacrylic resins include
a methacrylic resin (A) having a mass average molecular weight of 120,000 to 190,000 and
a methacrylic resin (B) having a mass average molecular weight of 10,000 to 60,000.

[7] The molded article according to any one of [1] to [6],
in which the at least one methacrylic resin has a structural unit derived from a methacrylic acid ester, and a content of the structural unit derived from the methacrylic acid ester is 98.0% by mass or more with respect to 100%, by mass of a total content of all structural units included in the methacrylic resin composition.

[8] The molded article according to (7), in which the methacrylic acid ester is methyl methacrylate.

[9] The molded article according to any one of [1] to [8], in which the at least one methacrylic resin further has a structural unit derived from an acrylic acid ester.

[10] The molded article according to (9), in which the acrylic acid ester is methyl acrylate.

A vehicle member formed of the molded article according to any one of [1] to [10].

[12] A method of producing the molded article according to any one of [1] to [10], the method including:
preparing a methacrylic resin composition containing at least one methacrylic resin; and
subjecting the methacrylic resin composition to injection molding under conditions in which an injection temperature is 240° C. to −70° C. and an injection speed is 10 mm/sec to 70 mm/sec to obtain a molded article.

According to the present invention, it is possible to provide a molded article containing a methacrylic resin composition excellent in a Charpy impact strength and a method of producing the same.

DETAILED DESCRIPTION OF THE PREFERRED EMBODIMENTS

Figure 1:
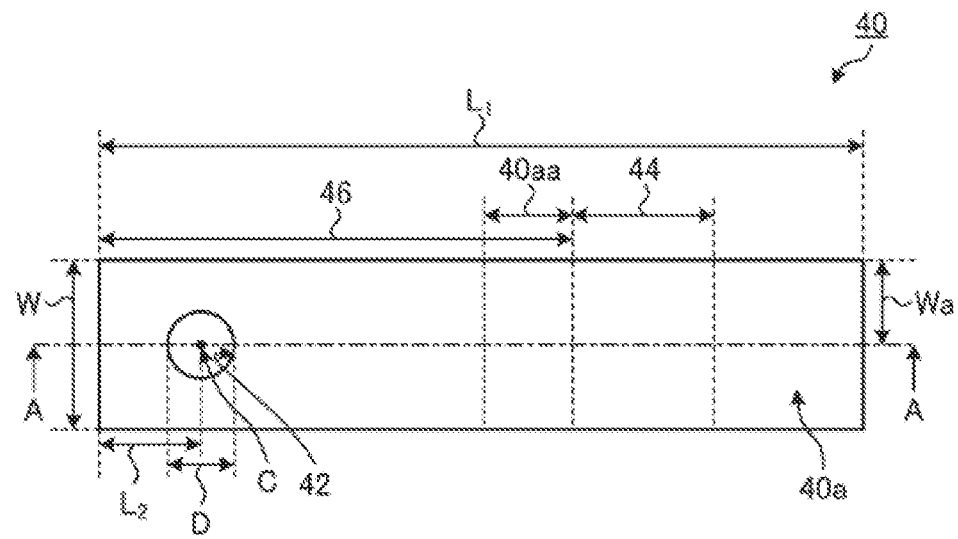
FIG. 1 is a schematic plan view for explaining a configuration of a test piece used for measuring a craze formation time.

In the present specification, unless otherwise specified, a numerical range of "A to B" means "A or more and B or less".

In the present specification, a structural unit derived from a certain monomer may be simply referred to as a "monomer unit" using the name of the monomer.

Hereinafter, embodiments of the present invention will be described with reference to the drawings. Note that each drawing merely schematically illustrates the shape, size, and arrangement of constituent elements to the extent that the invention can be understood. The present invention is not limited by the following description, and each constituent element can be appropriately changed without departing from the gist of the present invention. In the drawings used in the following description, the same constituent elements are denoted by the same reference numerals, and redundant description may be omitted. In addition, the configuration according to the embodiment of the present invention is not necessarily made or used in the arrangement of the illustrated example.

1. Molded Article

Hereinafter, a molded article according to the present embodiment will be described in detail.

The molded article of the present embodiment is a molded article containing a methacrylic resin composition containing at least one methacrylic resin,
in which a pencil hardness is 2 H or higher, and
a craze formation time is 19 seconds or longer, the craze formation time being measured by sequentially performing the following steps 1) to 5):

1) preparing a test piece that is a strip-shaped molded article, the test piece having a through-hole provided on one end side in a longitudinal direction; 2) heating and drying the test piece;

3) clamping the other end side of the test piece in the longitudinal direction and fixing the test piece to a fixing table so that extending directions of an upper surface and a lower surface of the test piece coincide with a horizontal direction;

4) applying ethanol one or more times to a predetermined region of the upper surface while generating a surface stress on the upper surface by applying a load calculated by the following Equation (1) in a vertical direction at a position where the through-hole of the test piece is provided, and maintaining a state in which the ethanol is applied, $$Wt=(1{,}785 \times W \times T_1^2)/(6 \times L_3) \tag{1}$$

wherein,

Wt represents the load (g) applied in the vertical direction at the position where the through-hole of the test piece is provided, W represents a length (mm) of the test piece in a transverse direction, $T_1$ represents a length (mm) of the test piece in a thickness direction, and $L_3$ represents a distance (mm) between a central axis of the through-hole of the test piece and the center of the predetermined region of the test piece to which the ethanol is applied; and 5) obtaining the craze formation time by measuring a time from the start of the application of the ethanol to the formation of the craze in the test piece.

According to the molded article of the present embodiment, in particular, a molded article excellent in a Charpy impact strength can be provided by setting the pencil hardness to 2 H or higher and setting the craze formation time to 19 seconds or longer.

(1) Pencil Hardness

In the molded article of the present embodiment, the pencil hardness is preferably 2 H or higher, and the pencil hardness is more preferably 2 H or 3 H.

Here, the pencil hardness and a method of measuring the pencil hardness will be described. The pencil hardness is a parameter that can particularly indicate an index of a scratch resistance of a surface of a molded article (injection molded article). The pencil hardness can be measured according to a measurement method specified in JIS K 5600.

In the present embodiment, the pencil hardness can be measured by preparing a test piece that is a strip-shaped (rectangular parallelepiped) molded article and using a measurement apparatus that is known in the related art and is available in any suitable market. For example, the pencil hardness can be measured under conditions in which a load is 750 g and a scratch speed of 0.5 mm/sec using an electric pencil scratch hardness tester ("553-M1", manufactured by Yasuda Seiki Seisakusho Ltd.) as the measurement apparatus.

More specifically, the pencil hardness can be evaluated by performing a test using a pencil having a plurality of hardnesses arranged so that a pencil lead has a columnar shape and visually observing whether a streaky scratch is formed on the surface of the test piece. Note that the surface of the test piece is visually observed in a room, and the test piece is lifted up to confirm the presence or absence of the streaky scratch while irradiating the test piece with light in indoor lighting and changing an inclination of the test piece.

Note that in a case where the used test piece is an injection molded article, the test piece is cut out in preparation of the test piece so that a transverse direction of the test piece coincides with an injection direction (machine direction (MD)) of the methacrylic resin composition.

(2) Craze Formation Time

In the molded article of the present embodiment, the craze formation time is preferably 19 seconds or longer, more preferably 19 seconds or longer and 54 seconds or shorter, and still more preferably 19 seconds or longer and 26 seconds or shorter.

A molded article excellent in a Charpy impact strength can be obtained by setting the pencil hardness to the above range (numerical value) and setting the craze formation time to the above range.

Here, the craze formation time and a method of measuring the craze formation time will be described. The craze formation time is a parameter that can indicate a toughness (mechanical strength) of the molded article, and can also indicate an index relating to a solvent resistance.

Specifically, the craze formation time can be measured by sequentially performing steps 1) to 5) described above. In the present embodiment, the measurement and evaluation of the craze formation time are preferably performed by a so-called cantilever method.

Figure 2:
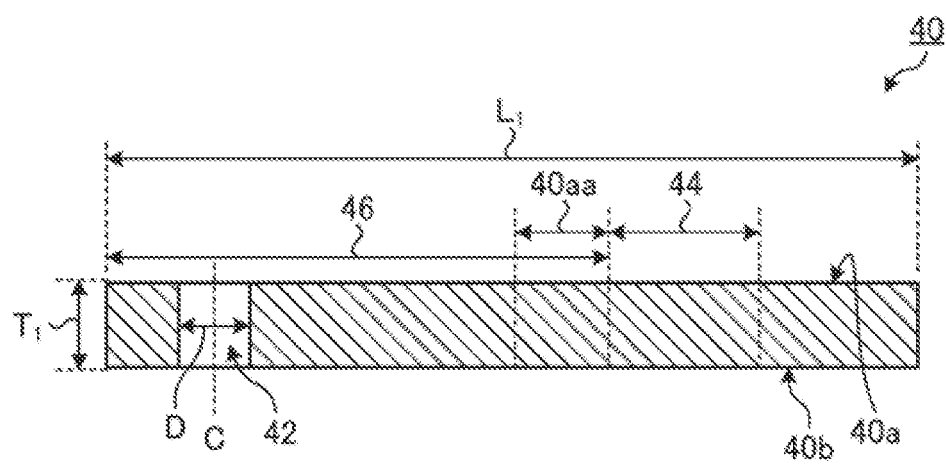
FIG. 2 is a schematic cross-sectional view for explaining the configuration of the test piece used for measuring the craze formation time.

Hereinafter, the measurement of the craze formation time by the cantilever method will be described in detail with reference to the drawings. FIG. 1 is a schematic plan view for explaining a configuration of a test piece used for measuring a craze formation time. FIG. 2 illustrates a cut cross-sectional view obtained by cutting the test piece at a position of the A-A dashed dotted line illustrated in FIG. 1, and is a schematic cross-sectional view for explaining the configuration of the test piece used for measuring the craze formation time.

Step 1)

Step 1) is a step of preparing a test piece. Step 1) is a step of preparing a test piece 40 that is a strip-shaped molded article having a through-hole 42 provided on one end side in a longitudinal direction as illustrated in FIGS. 1 and 2.

The size of the test piece can be set to any suitable size in consideration of a method of producing a molded article as a test piece, producing conditions, a measurement apparatus that can be used, measurement conditions, and the like.

Hereinafter, an injection molded article as a molded article produced by an injection molding method will be described in detail as an example of the test piece.

In the present embodiment, in the test piece 40 used for measuring the craze formation time, a length ($L_1$) in a longitudinal direction can be, for example, 174 mm, a length (width W) in a transverse direction orthogonal to the longitudinal direction can be, for example, 25.4 mm, and a length (thickness $T_1$) in a thickness direction orthogonal to both the longitudinal direction and the transverse direction can be, for example, 3 n. Therefore, the test piece 40 in the present embodiment is a strip-shaped (rectangular parallelepiped) injection molded article as a whole.

Note that, in the preparation, the test piece 40 is cut out so that the longitudinal direction (the extending direction of $L_1$) coincides with the injection direction (MD) of the methacrylic resin composition as a raw material in an injection molding machine.

The through-hole 42 is provided in the test piece 40 as described above. In the present embodiment, the through-hole 42 has the central axis (C) at a point separated by a length ($L_2$) in the longitudinal direction from one edge of the longitudinal direction, that is, 10 mm, and a length (Wa) from one edge of the transverse direction (the extending direction of W), that is, 12.7 mm, and the central axis (C) can penetrate from an upper surface 40a of the test piece 40 to a lower surface 40b of the test piece 40 in the thickness ($T_1$) direction to be formed in a columnar shape having a diameter (D) of 6 mm so that the thickness ($T_1$) direction is the extending direction.

Step 2)

Step 2) is a step of heating and drying the test piece 40. Step 2) can be performed under any suitable condition as a condition in which the shape and characteristics of the test piece 40 are not impaired using any suitable apparatus known in the related art.

Specifically, the heating according to step 2) can be performed by, for example, heating and drying the test piece 40 at 80° C. for 7 hours using a hot air circulation oven available on the market.

In a case where the test piece 40 heated and dried according to step 2) is not subjected to step 3) described later, which follows immediately after the heating and drying, for example, the test piece 40 is preferably stored in a desiccator to which a desiccant is added. The time during which the test piece 40 is stored in the desiccator can be, for ex ample, 16 hours.

Step 3)

Step 3) is a step of clamping the other end side of the test piece 40 in the longitudinal direction and fixing the test piece 40 to a fixing table so that extending directions of the upper surface 40a and the lower surface 40b of the test piece 40 coincide with the horizontal direction, the other end side being opposite to the edge side on which the through-hole is provided in the longitudinal direction of the test piece 40.

Note that, in the present embodiment, it is preferable that steps 3) to (5) are performed under a constant temperature and constant humidity condition in any suitable constant temperature and constant humidity apparatus known in the related art. It is preferable that steps 3) to 5) are performed by allowing the test piece 40 to stand in a constant temperature and constant humidity room in which a temperature is 23° C. and a relative humidity is 50.

Specifically, step 3) can be a step of clamping a clamp region 44 having a range separated by 100 mm to 130 mm in the longitudinal direction from the edge of the longitudinal direction closer to the through-hole 42 of the upper surface 40a and the lower surface 40b facing each other that are main surfaces defined by a long side ($L_1$) extending in the longitudinal direction of the test piece 40 and a short side (W) extending in the transverse direction of the test piece 40 to fix the test piece 40 to a fixing table so that the extending directions of the upper surface 40a and the lower surface 40b coincide with the horizontal direction while exposing an exposure region 46.

Step 4)

Step 4) is a step of applying ethanol one or more times to a predetermined region of the upper surface 40a in the exposure region 46 of the test piece 40, that is, an application region 40aa, while generating a surface stress on the upper surface 40a by applying a load calculated by the above Equation (1) in a vertical direction at a position where the through-hole 42 of the test piece 40 is provided, and maintaining a state in which the ethanol is applied.

In the present embodiment, the application region 40aa according to step 4) is a band-shaped region set in the surface 40a. Specifically, it is preferable that the application region 40aa is provided as a band-shaped region extending over two long sides ($L_1$) facing each other in a range separated by 90 mm to 100 nm in the longitudinal direction from the edge of the longitudinal direction ($L_1$) closer to the through-hole 42 of the upper surface 40a of the test piece 40 (that is, a distance $L_3$ between the central axis C of the through-hole of the test piece and the center of the ethanol application region of the test piece is 75 mm to 95 mm)).

Specifically, step 4) can be a step of applying a selected ethanol solvent one or more times to the application region 40aa while generating a surface stress on the upper surface 40a by applying a load calculated by the above Equation (1) in the vertical direction at the position where the through-hole 42 is provided, and maintaining a state in which the ethanol is applied to prevent the applied ethanol solvent from volatilizing and disappearing, that is, a state in which the ethanol solvent is present on the entire surface of the application region 40aa. The load calculated by the above Equation (1) is, for example, 800 g.

A method of applying the load to the band-shaped application region 40aa of the upper surface 40a is not particularly limited. In the present embodiment, a surface stress is applied to the application region 40aa of the upper surface 40a by applying a load using the through-hole 42 described above. Specifically, a wire-shaped member having one end fixed to a locking member locked to the upper surface 40a of the test piece 40 and the other end fixed to a load member passes through the through-hole 42 to suspend the load member, thereby applying the load. Therefore, the surface stress can be applied to the application region 40aa of the upper surface 40a.

Step 5) is a step of obtaining the craze formation time by measuring a time from the start of the application of the selected solvent to the formation of the craze (crack) in the test piece 40. That is, a time required from the start of the application to the formation of the craze can be obtained as the craze formation time by visually measuring the time from the start of the application of the solvent to the formation of the craze in the application region 40aa of the test piece 40 in a state in which the surface stress is applied to the application region 40aa of the upper surface 40a of the test piece 40.

The craze formation time of the molded article of the present embodiment can be determined by steps 1) to 5) described above.

(3) Charpy Impact Strength

As described above, a molded article excellent in a Charpy impact strength can be obtained by setting the pencil hardness and the craze formation time to the predetermined ranges.

Here, the "Charpy impact strength" is an index relating to a toughness of the entire molded article (injection molded article), and is a parameter relating to an absorption energy for absorbing impact. Therefore, the "pencil hardness" described above is an index that is not directly related.

The "Charpy impact strength (kJ/m=)" applied to the molded article (injection molded article) of the present embodiment can be measured according to the normal method of preparing a predetermined sample using any suitable measurement apparatus known in the related art (for example, "IMPACT TESTER", manufactured by Yasuda Seiki Seisakusho Ltd.).

In the present embodiment, the Charpy impact strength of the molded article is generally more than 20 $kJ/m^2$, preferably more than 20 $kJ/m^2$ and 30 $kJ/m^2$ or less, and more preferably more than 20 $kJ/m^2$ and 25 $kJ/m^2$ or less.

2. Methacrylic Resin Composition

Here, the "methacrylic resin composition containing at least one methacrylic resin" that is a material of the molded article of the present embodiment will be described in detail with reference to FIGS. 3 and 4.

As described above, the methacrylic resin composition contains at least one methacrylic resin. In the present embodiment, it is preferable that the methacrylic resin composition contains at least a methacrylic resin (A) and a methacrylic resin (B). In addition, in the present embodiment, the methacrylic resin composition is preferably a composition satisfying the following requirements (i) to (iii), and more preferably the composition satisfying the following requirements (i) to (iii) that contains at least a methacrylic resin (A) and a methacrylic resin (B). Note that the following description of the "methacrylic resin" corresponds to both the methacrylic resin (A) and the methacrylic resin (B) that are contained in the methacrylic resin composition.

(i) W1 is 10 to 25, in which W1 is a ratio (%) of a peak area from a starting point A to a molecular weight of 30,000 to a peak area from the starting point to an end point in a differential molecular weight distribution curve of the methacrylic resin composition. W1 is preferably 10 to 20 and more preferably 13 to 18.

(ii) W2 is 5 to 35, in which W2 is a ratio (%) of a peak area from a molecular weight of 300,000 to the end point to the peak area from the starting point to the end point in the differential molecular weight distribution curve of the methacrylic resin composition. W2 is preferably 5 to 30 and more preferably 6 to 30.

(iii) a ratio (Mw/Mn) of a mass average molecular weight of the methacrylic resin composition to a number average molecular weight of the methacrylic resin composition is 2.0 to 6.0. Mw/Mn is preferably 2.0 to 5.0 and more preferably 2.5 to 5.0.

When the methacrylic resin composition satisfies the requirements (i), (ii), and (iii), the pencil hardness of the molded article of the present embodiment can be set to the predetermined value, and the craze formation time of the molded article can be set to the above range. As a result, the Charpy impact strength of the molded article can be improved.

In the methacrylic resin composition, it is preferable that the at least one methacrylic resin has a structural unit derived from a methacrylic acid ester, and a content of the structural unit derived from the methacrylic acid ester included in the methacrylic resin composition is 98.0% by mass or more with respect to 100% by mass of a total content of all structural units included in the methacrylic resin composition, and it is more preferably that both the methacrylic resin (A) and the methacrylic resin (B) have a structural unit derived from a methacrylic acid ester, and a content of the structural unit derived from the methacrylic acid ester included in the methacrylic resin composition is 98.0% by mass or more with respect to 100% by mass of the total content of all structural units included in the methacrylic resin composition.

The methacrylic resin has a structural unit derived from a methacrylic acid ester (hereinafter, may be referred to as a methacrylic acid ester unit). Examples of the methacrylic acid ester used for preparing the methacrylic resin can include alkyl methacrylates such as methyl methacrylate, ethyl methacrylate, 2-ethylhexyl methacrylate, lauryl methacrylate, benzyl methacrylate, and cyclohexyl methacrylate. In the present embodiment, the methacrylic acid ester is preferably methyl methacrylate. In the preparation of the methacrylic resin, the methacrylic acid esters exemplified above may be used alone or in combination of two or more thereof.

A content of the methacrylic acid ester unit of the methacrylic resin included in the methacrylic resin composition is 98.0% by mass or more, preferably 98.4% by mass or more, but generally 100.0V by mass or less, preferably 99.5% by mass or less, more preferably 98.4 to 99.5% by mass, and still more preferably 98.6 to 99.5% by mass, with respect to 100% by mass of all structural units included in the methacrylic resin composition. Note that the content can be determined by, for example, any suitable analysis method using a pyrolysis gas chromatography apparatus known in the related art.

At least one methacrylic resin may further have a monomer unit other than the methacrylic acid ester unit, or both the methacrylic resin (A) and the methacrylic resin (B) may further have a monomer unit other than the methacrylic acid ester unit. An example of the monomer unit other than the methacrylic acid ester unit can include a structural unit derived from an acrylic acid ester (hereinafter, may be referred to as an "acrylic acid ester unit").

Examples of the acrylic acid ester can include methyl acrylate, ethyl acrylate, propyl acrylate, n-butyl acrylate, sec-butyl acrylate, tert-butyl acrylate, cyclohexyl acrylate, benzyl acrylate, 2-ethylhexyl acrylate, 2-hydroxyethyl acrylate, and cyclopentadiene acrylate. In the present embodiment, the acrylic acid ester is preferably methyl acrylate or ethyl acrylate, and more preferably methyl acrylate. The acrylic acid esters exemplified above may be used alone or in combination of two or more thereof.

A content of the acrylic acid ester unit that can be included in the methacrylic resin composition is preferably 0 to 1.6% by mass, more preferably 0.5 to 1.6% by mass, still more preferably 0.5 to 1.5% by mass, particularly preferably 0.5 to 1.4% by mass, and more particularly preferably 1.2 to 1.4% by mass. Here, a total content of the methacrylic acid ester unit and the acrylic acid ester unit in the methacrylic resin composition is 100% by mass.

When the content of the acrylic acid ester unit is within the above range, the progress of depolymerization of the copolymer to be obtained is suppressed, and the thermal stability during injection molding can be further improved. When the content of the acrylic acid ester unit is 1.6% by mass or less, heat resistance (Vicat softening temperature or the like) of the molded article can be further improved.

The contents of the methacrylic acid ester unit and the acrylic acid ester unit can be determined by, for example, any suitable analysis method using a pyrolysis gas chromatography apparatus known in the related art.

Specifically, for example, the contents of the methacrylic acid ester unit and the acrylic acid ester unit can be determined by pyrolyzing the methacrylic resin composition using a pyrolysis furnace (pyrolyzer) at a predetermined temperature (400° C. or higher), analyzing the generated decomposed gas using a gas chromatography apparatus, determining an area ratio of a peak corresponding to each of monomer components (for example, methyl methacrylate and methyl acrylate) used in the production of the methacrylic resin composition, and converting the obtained area ratio into a mass ratio (%).

As for a method of converting the area ratio into the mass ratio (%) for example, for a standard product of a methacrylic resin (that is available as a commercial product and is a methacrylic resin whose types and mass ratios of the monomer components are known), an area ratio of a peak corresponding to each monomer component is determined in advance similarly to the above, a factor with which the area ratio can be converted into the mass ratio (%) of the monomer component is calculated, or a factor is calculated by creating a calibration curve using a plurality of standard products, if necessary, and the area ratio of the monomer component of the methacrylic resin contained in the methacrylic resin composition of the present invention can be converted into the corresponding mass ratio (%) using the factor. Note that in a case where these peaks partially overlap with each other, the area ratio and the mass ratio (%) can be calculated by correcting the overlapping area using any suitable method known in the related art.

An example of an optional structural unit that may be included in the methacrylic resin can include a structural unit derived from another monomer copolymerizable with a methacrylic acid ester and/or an acrylic acid ester (hereinafter, referred to as another monomer unit), in addition to the acrylic acid ester unit. Examples of a monomer for forming another monomer unit can include a monofunctional monomer having only one radically-polymerizable double bond and a polyfunctional monomer having two or more radically-polymerizable double bonds. These monomers may be used alone or in combination of two or more thereof.

Examples of the monofunctional monomer can include an unsaturated carboxylic acid such as acrylic acid, methacrylic acid, maleic acid, itaconic acid, maleic anhydride, or itaconic anhydride, or an acid anhydride thereof; a nitrogen-containing monomer such as acrylamide, methacrylamide, acrylonitrile, or methacrylonitrile; and a styrene-based monomer such as styrene or α-methylstyrene.

Examples of the polyfunctional monomer can include an unsaturated carboxylic acid diester of a glycol, such as ethylene glycol dimethacrylate or butanediol dimethacrylate; an alkenyl ester of an unsaturated carboxylic acid, such as allyl acrylate, allyl methacrylate, or allyl cinnamate; an alkenyl ester of a polybasic acid, such as diallyl phthalate, diallyl maleate, triallyl cyanurate, or triallyl isocyanurate; an unsaturated carboxylic acid ester of a polyhydric alcohol such as trimethylolpropane triacrylate; and divinylbenzene.

W1, W2, the mass average molecular weight, and the number average molecular weight in the requirements (i), (ii), and (iii) described above can be determined using size-exclusion chromatography (SEC) known in the related art, such as gel permeation chromatography (GPC), according to JIS K 7252-1 to 4 (Plastic-Determination Method of Average Molecular Weight and Molecular Weight Distribution of Polymer by Size-Exclusion Chromatography—Part 1 to Part 4).

More specifically, first, a calibration curve showing a correlation between an elution time (t) and a logarithm (log M) of a molecular weight (M) is created in advance using a commercially available monodispersed standard sample of a methacrylic resin (a standard substance whose molecular weights such as a number average molecular weight and a mass average molecular weight are known and whose range of molecular weight distribution is narrow).

Next, a sample containing a methacrylic resin composition to be measured is dissolved in an appropriate solvent to prepare a dilute solution. The solution is injected into a mobile phase (an eluent) and introduced into a SEC column. Note that the SEC column is filled with non-absorbent fine particles having fine pores with a uniform size or various sizes. The samples can be separated from each other by a difference in molecular weight (hydrodynamic volume) as the samples pass through the SEC column. In the SEC column, since a methacrylic resin having a high molecular weight cannot permeate into the fine pores, its elution is fast. On the other hand, since a methacrylic resin having a low molecular weight can permeate into the fine pores, its elution is slow. Then, a concentration of the methacrylic resin in the eluent is continuously detected with a concentration detector to obtain a SEC chromatogram.

Here, the molecular weight (M) of the methacrylic resin corresponding to an arbitrary elution time (t) in the SEC chromatogram is determined using the calibration curve created in advance using a standard sample having a monodisperse molecular weight.

A "differential molecular weight distribution curve" is created by plotting dW/d (log M) against the molecular weight (M) of the methacrylic resin on the basis of the data obtained in the above. Here, "W" refers to a concentration fraction.

Specifically, the differential molecular weight distribution curve can be created by plotting $dW_i/d(\log M_i)$ against a molecular weight ($M_i$) of the methacrylic resin, $dW_i/d(\log M_i)$ being calculated according to the following equations using the molecular weight ($M_i$) of the methacrylic resin and a signal intensity ($H_i$) of the methacrylic resin at each elution time ($t_i$).

$$\Delta W_i = \frac{H_i}{\sum_{i=1}^{n} H_i}$$ [Math. 1]

$$w_i = \Delta W_i \times \frac{1}{I}$$

$$\frac{dW_i}{d(\log M_i)} = -w_i \times \frac{dt_i}{d(\log M_i)}$$

In the equation, I represents a data collection interval (min).

A specific example of the differential molecular weight distribution curve created as described above will be described with reference to FIGS. 3 and 4. FIG. 3 is a graph showing a differential molecular weight distribution curve of a methacrylic resin composition 1 according to Preparation Example 1 to be described below. FIG. 4 is a graph showing a differential molecular weight distribution curve of a methacrylic resin composition 2 according to Preparation Example 2 to be described below.

Figure 3:
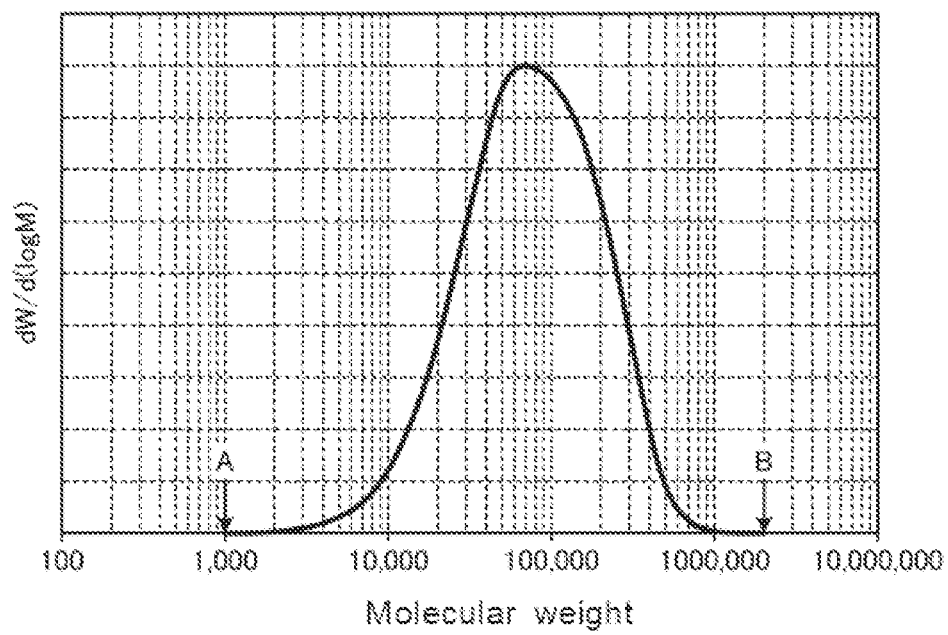
FIG. 3 is a graph showing a differential molecular weight distribution curve of a methacrylic resin composition 1.
Figure 4:
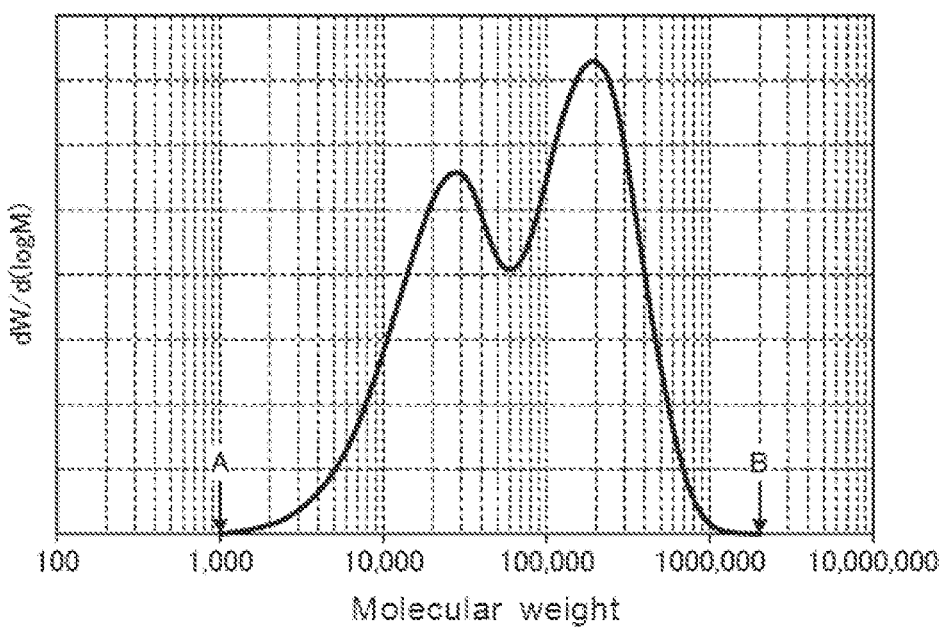
FIG. 4 is a graph showing a differential molecular weight distribution curve of a methacrylic resin composition 2.

As illustrated in FIGS. 3 and 4, among two points at which the differential molecular weight distribution curve and the straight line of dW/d (log M)=0 are in contact with each other, a point positioned on the lower molecular weight side is defined as a point A (starting point), and a point positioned on the higher molecular weight side is defined as a point B (end point).

Then, when the area of the region surrounded by the curve from the starting point to the end point and the straight line (hereinafter, referred to as a "peak area") is 100, the ratio (%) of the peak area from the starting point to the molecular weight of 30,000 to the peak area from the starting point to the end point is defined as "W1", and the ratio (%) of the area from the molecular weight of 300,000 to the end point is defined as "W2".

As specified in the requirement (i), in the present embodiment, a value of W1 is 10 to 25, preferably 14 to 22, and more preferably 17 to 19. When the value of W1 is higher than 25, a Charpy impact strength may be decreased. In addition, when the value of W1 is lower than 10, fluidity may be decreased.

As specified in the requirement (ii), a value of W2 is preferably 5 to 35 and more preferably 3 to 15. When the value of W2 is higher than 35, fluidity may be decreased. When the value of W2 is lower than 5, solvent resistance may be decreased.

The value of W2 is preferably 5 or higher and more preferably 6 or higher, but is preferably 35 or lower and more preferably 15 or lower, from the viewpoint of setting the craze formation time to an allowable time or shorter.

As specified in the requirement (iii), the ratio (Mw/Mn) of the mass average molecular weight of the methacrylic resin composition to the number average molecular weight of the methacrylic resin composition is preferably 2.0 to 6.0 and more preferably 2.5 to 4.9.

It is preferable that mass average molecular weights of the methacrylic resin (A) and the methacrylic resin (B) contained in the methacrylic resin composition are different from each other, from the viewpoint of solvent resistance, a Charpy impact strength, and fluidity. It is more preferable that the mass average molecular weight of the methacrylic resin (A) is 120,000 or more and 180,000 or less and the mass average molecular weight of the methacrylic resin (B) is 10,000 or more and 60,000 or less.

The mass average molecular weight of the methacrylic resin (A) is preferably 120,000 or more and 180,000 or less, and more preferably 130,000 or more and 160,000 or less. The mass average molecular weight of the methacrylic resin (B) is preferably 10,000 or more and 60,000 or less, and more preferably 30,000 or more and 50,000 or less. The methacrylic resin composition may contain two or more methacrylic resins (A) having different mass average molecular weights, and may contain two or more methacrylic resins (B) having different mass average molecular weights.

A molded article excellent in a Charpy impact strength can be obtained using the methacrylic resin (A) and the methacrylic resin (B) whose mass average molecular weights are in the above ranges.

A method of measuring the mass average molecular weight is the same as the above method (method using SEC) described in the calculation method of W1 and W2 in the methacrylic resin composition.

A content of one of the methacrylic resin (A) and the methacrylic resin (B) and a content of the other of the methacrylic resin (A) and the methacrylic resin (B) contained in the methacrylic resin composition are preferably 25% by mass to 35% by mass and 65% by mass to 75% by mass, respectively, with respect to 100% by mass of a total content of the methacrylic resin (A) and the methacrylic resin (B).

When the contents of the methacrylic resin (A) and the methacrylic resin (B) are in the above ranges, a molded article excellent in a Charpy impact strength can be obtained.

(II) Method of Producing Methacrylic Resin Composition

The methacrylic resin composition can be produced by any suitable production method known in the related art. Specifically, the methacrylic resin contained in the methacrylic resin composition can be produced, for example, by polymerizing a monomer component such as the methacrylic acid ester or further another monomer.

Examples of a method of producing a methacrylic resin by polymerizing a monomer component such as the methacrylic acid ester or further another monomer can include known polymerization methods such as a suspension polymerization method, a solution polymerization method, and a bulk polymerization method, and a bulk polymerization method is preferred.

In the case of the bulk polymerization method, since a polymerization stabilizer is not used, a methacrylic resin excellent in an appearance can be obtained. In addition, unlike in the suspension polymerization, a polymerization temperature is higher than 100° C., and as a result, syndiotacticity of the methacrylic resin is likely to be decreased, such that fluidity of the methacrylic resin is further increased. In a case where the bulk polymerization is continuously performed, for example, a partial polymer can be continuously extracted, the partial polymer being obtained by continuously feeding the monomer component, and if necessary, a polymerization initiator, a chain transfer agent, and the like, to a reaction vessel, and allowing them to retain in the reaction vessel for a predetermined time. As a result, a methacrylic resin can be produced by efficient polymerization.

In the production of the methacrylic resin contained in the methacrylic resin composition of the present invention, a polymerization temperature is preferably 110° C. to 190° C.

In the method of producing a methacrylic resin, particularly in the bulk polymerization, an additive such as a polymerization initiator or a chain transfer agent may also be used. As the polymerization initiator, for example, a radical initiator can be used.

Examples of the radical initiator can include an azo compound such as azobisisobutyronitrile, azobisdimethylvaleronitrile, azobiscyclohexanenitxile, 1,1'-azobis(1-acetoxy-1-phenylethane), dimethyl 2,2'-azobisisobutyrate, or 4,4'-azobis-4-cyanovaleric acid; and an organic peroxide such as benzoyl peroxide, lauroyl peroxide, acetyl peroxide, caprylyl peroxide, 2,4-dichlorobenzoyl peroxide, isobutyl peroxide, acetylcyclohexylsulfonyl peroxide, tert-butyl peroxypivalate, tert-butyl peroxyneodecanoate, text-butyl peroxyneoheptanoate, tert-butyl peroxy-2-ethylhexanoate, 1,1-di(tert-butylperoxy)cyclohexane, 1,1-di(tert-butylperoxy)-3,3,5-trimethylcyclohexane, 1,1-di(tert-hexylperoxy)-3,3,5-trimethylcyclohexane, diisopropyl peroxydicarbonate, diisobutyl peroxydicarbonate, di-sec-butyl peroxydicarbonate, di-n-butyl peroxydicarbonate, bis(2-ethylhexyl)peroxydicarbonate, bis(4-tert-butylcyclohexyl)peroxydicarbonate, tert-amyl peroxy-2-ethylhexanoate, 1,1,3,3-tetramethylbutyl peroxy-ethylhexanoate, 1,1,2-trimethylpropyl peroxy-2-ethylhexanoate, tert-butyl peroxyisopropylmonocarbonate, tert-amyl peroxyisopropylmonocarbonate, tert-butyl peroxy-2-ethylhexylcarbonate, tert-butyl peroxyallylcarbonate, tert-butyl peroxyisopropylcarbonate, 1,1,3,3-tetramethylbutyl peroxyisopropylmonocarbonate, 1,1,2-trimethylpropyl peroxyisopropylmonocarbonate, 1,1,3,3-tetramethylbutyl peroxyisononanate, 1,1,2-trimethylpropyl peroxy-isononanate, or tert-butyl peroxybenzoate.

The polymerization initiators may be used alone or in combination of two or more thereof.

The type of the polymerization initiator can be selected depending on the type of a methacrylic resin to be synthesized or a raw material monomer to be used. The radical initiator is preferably a polymerization initiator having a half-life period within 1 minute at the polymerization temperature.

The chain transfer agent that can be used in the present embodiment may be either a monofunctional chain transfer agent or a polyfunctional chain transfer agent. Specific examples of the chain transfer agent can include alkyl mercaptans such as n-propyl mercaptan, isopropyl mercaptan, n-butyl mercaptan, tert-butyl mercaptan, n-hexyl mercaptan, n-octyl mercaptan, 2-ethylhexyl mercaptan, n-dodecyl mercaptan, and tert-dodecyl mercaptan, aromatic mercaptans such as phenyl mercaptan and thiocresol, mercaptans having 18 or fewer carbon atoms, such as ethylene thioglycol, polyhydric alcohols such as ethylene glycol, neopentyl glycol, trimethylolpropane, pentaerythritol, dipentaerythritol, tripentaerythritol, and sorbitol, a compound whose hydroxyl group is esterified with thioglycolic acid or 3-mercaptopropionic acid, 1,4-dihydronaphthalene, 1,4,5,8-tetrahydronaphthalene, β-terpinene, terpinolene, 1,4-cyclohexadiene, and hydrogen sulfide. The chain transfer agents may be used alone or in combination of two or more thereof.

The type and use amount of the chain transfer agent can be appropriately selected depending on the type of a methacrylic resin to be synthesized or a raw material monomer to be used. As the chain transfer agent, n-octyl mercaptan or n-dodecyl mercaptan is preferred.

In addition to the raw material monomer, the polymerization initiator, and the chain transfer agent, for example, a release agent, a rubber-like polymer such as butadiene or styrene-butadiene robber (SBR), a thermal stabilizer, an ultraviolet absorber, or the like may also be used.

Here, the release agent is a component used for improving moldability of the methacrylic resin composition. The thermal stabilizer is a component used for suppressing pyrolysis of the methacrylic resin. The ultraviolet absorber is a component used for suppressing deterioration of the methacrylic resin due to ultraviolet rays.

The release agent is not particularly limited. Examples of the release agent can include a higher fatty acid ester, a higher aliphatic alcohol, a higher fatty acid, a higher fatty acid amide, and a higher fatty acid metal salt. These release agents may be used alone or in combination of two or more thereof.

A use amount of the release agent is preferably 0.01 to 1.0 part by mass, and more preferably 0.03 to 0.50 parts by mass, with respect to 100 parts by mass of the methacrylic resin. Note that in a case where the methacrylic resin composition of the present invention contains two or more methacrylic resins, "100 parts by mass of the methacrylic resin" means a total amount of two or more methacrylic resins.

The thermal stabilizer is not particularly limited. Examples of the thermal stabilizer can include a hindered phenol-based thermal stabilizer, a phosphorus-based thermal stabilizer, and an organic disulfide compound. Among them, an organic disulfide compound is preferred. Note that these thermal stabilizers may be used alone or in combination of two or more thereof.

A use amount of the thermal stabilizer is preferably 1 to 2,000 mass ppm with respect to 100 parts by mass of the methacrylic resin. When the methacrylic resin composition (more specifically, the methacrylic resin composition after devolatilization) is molded to produce a molded article formed of the methacrylic resin composition, a molding temperature may be set to be higher to improve molding efficiency. In such a case, when a thermal stabilizer is blended, the resin composition can be more effectively molded.

Examples of the ultraviolet absorber can include a benzophenone-based ultraviolet absorber, a cyanoacrylate-based ultraviolet absorber, a benzotriazole-based ultraviolet absorber, a malonic acid ester-based ultraviolet absorber, and an oxalanilide-based ultraviolet absorber. These ultraviolet absorbers may be used alone or in combination of two or more thereof. Among them, a benzotriazole-based ultraviolet absorber, a malonic acid ester-based ultraviolet absorber, or an oxalanilide-based ultraviolet absorber is preferred.

A use amount of the ultraviolet absorber is preferably 5 to 1,000 mass ppm with respect to 100 parts by mass of the methacrylic resin contained in the methacrylic resin composition.

An example of the method of producing a methacrylic resin composition can include a method of kneading the methacrylic resin and, if necessary, an optional appropriate another component (the release agent, the rubber-like polymer, the thermal stabilizer, and the ultraviolet absorber described above).

An example of the method of producing a methacrylic resin composition can include a method in which a monomer component capable of synthesizing one methacrylic resin of two methacrylic resins is polymerized in the presence of a composition (syrup) containing the other of the two methacrylic resins using a multi-stage polymerization method, and then the composition is kneaded in an extruder.

An example of the multi-stage polymerization method can include a method described in WO 2014/088082.

Figure 5:
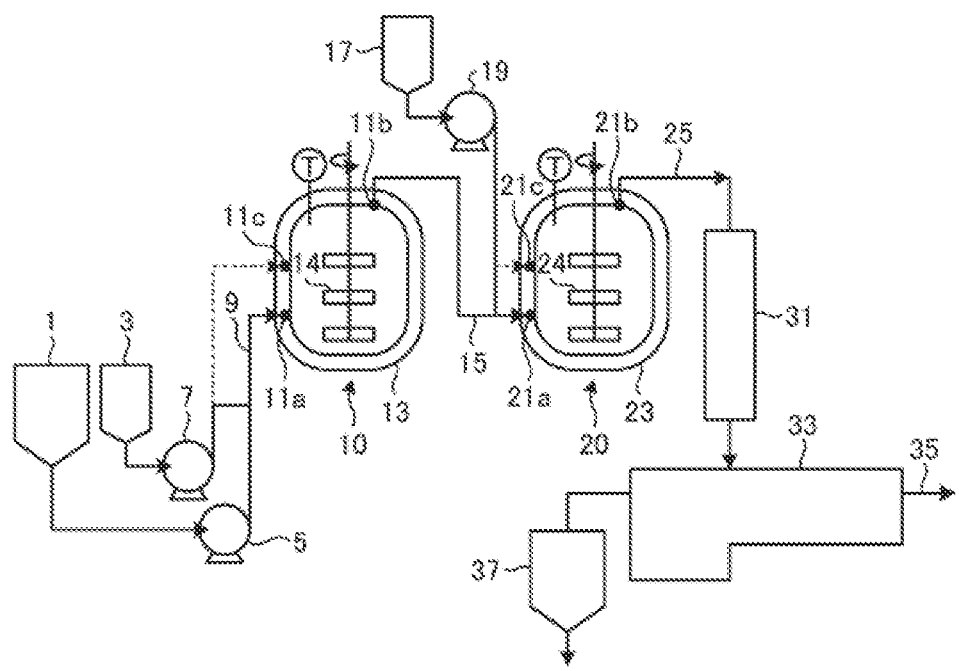
FIG. 5 is a schematic view for explaining an apparatus for producing a methacrylic resin composition.

Here, a configuration example of an apparatus for producing a methacrylic resin composition that can be preferably applied to a multi-stage polymerization method and a method of producing a methacylic resin composition will be described with reference to FIG. 5. FIG. 5 is a schematic view for explaining the apparatus for producing a methacrylic resin composition.

The apparatus for producing a methacrylic resin composition according to the present embodiment includes a raw material monomer tank 1, a polymerization initiator tank 3, a pump 5, a pump 7, a raw material feed line 9, a first reaction tank 10, a feed port 11a, an extraction port 11b, a feed port 11c, a jacket 13, a stirrer 14, a connection line 15, a polymerization initiator tank 17, a pump 19, a second reaction tank 20, a feed port 21a, an extraction port 21b, a feed port 21c, a jacket 23, a stirrer 24, an extraction line 25, a pre-heater 31, a devolatilization extruder 33, a discharge line 35, and a recovery tank 37.

As illustrated in FIG. 5, the multi-stage polymerization method that is the method of producing a methacrylic resin composition is performed using two reaction tanks, and continuous bulk polymerization is preferably performed in each of the reaction tanks. For example, one of two methacrylic resins can be prepared in the first reaction tank 10, and the other of the two methacrylic resins can be prepared in the second reaction tank 20 in the presence of the one methacrylic resin. Here, each of the first reaction tank 10 and the second reaction tank 20 is a complete mixing reaction tank.

A temperature in the first reaction tank 10 is preferably 110° C. to 160° C., more preferably 110° C. to 150° C., and still more preferably 120° C. to 140° r. When the temperature in the first reaction tank 10 is within the above range, a concentration of a chain transfer agent in the first reaction tank 10 is preferably 0.12 to 0.19% by mass with respect to a total mass of a raw material monomer fed to the first reaction tank 10.

A temperature in the second reaction tank 20 is preferably 170° C. to 190° C., and more preferably 175° C. to 165° C. When the temperature in the second reaction tank 20 is within the above range, a concentration of a chain transfer agent fed to the second reaction tank 20 is preferably 0.10 to 0.25% by mass with respect to a total mass of a raw material monomer fed to the second reaction tank 20.

The method of producing a methacrylic resin composition according to the present embodiment includes a first polymerization step and a second polymerization step.

In the first polymerization step, a raw material composition (A) containing a raw material monomer (A) containing 98.0% by mass or more of a methacrylic acid ester, a polymerization initiator (A), and a chain transfer agent (A) is fed to the first complete mixing reaction tank that is the first reaction tank 10, the raw material composition (A) is subjected to continuous bulk polymerization in the first complete mixing reaction tank to obtain an intermediate composition (A), and the obtained intermediate composition (A) is extracted from the first complete mixing reaction tank.

In the second polymerization step, a raw material composition (B) containing a raw material monomer (B) containing 98.0% by mass or more of a methacrylic acid ester, a polymerization initiator (B), and a chain transfer agent (B), and the intermediate composition (A) extracted in the first polymerization step are fed to the second complete mixing reaction tank that is the second reaction tank 20, the raw material composition (B) and the intermediate composition (A) are further subjected to continuous bulk polymerization in the second complete mixing reaction tank to prepare a methacrylic resin composition, and the prepared methacrylic resin composition is extracted from the second complete mixing reaction tank. As described above, the methacrylic resin composition of the present embodiment can be produced.

Examples and preferred examples of the methacrylic acid esters contained in the raw material monomer (A) and the raw material monomer (B) can include examples and preferred examples of the methacrylic acid esters of the methacrylic resin (A) or the methacrylic resin (B) described above.

As the polymerization initiator (A) and the polymerization initiator (B), the polymerization initiator exemplified above can be used. As the chain transfer agent (A) and the chain transfer agent (B), the chain transfer agent exemplified above can be used.

In the present embodiment, the method of producing a methacrylic resin composition preferably satisfies the following requirements (11) and (12).

$$0.7 \leq L^A/L^B \leq 1.8 \tag{11}$$

$$1.0 \leq S^B/S^A \leq 5.0 \tag{12}$$

In the requirement (11), $L^A$ represents a concentration (% by mass) of the polymerization initiator (A) in the raw material composition (A). $L^B$ represents a concentration (% by mass) of the polymerization initiator (B) in a mixture of the raw material composition (B) and the intermediate composition (A).

In the requirement (12), $S^A$ represents a concentration (% by mass) of the chain transfer agent (A) in the raw material composition (A). $S^B$ represents a concentration (% by mass)

of the chain transfer agent (B) in the mixture of the raw material composition (B) and the intermediate composition (A).

In the present embodiment, when the method of producing a methacrylic resin composition satisfies the requirements (11) and (12), a methacrylic resin composition capable of obtaining a molded article excellent in a Charpy impact strength can be produced.

A value of $L^A/L^B$ is more preferably 1.6 or higher, and still more preferably 1.7 or higher, but more preferably 1.8 or lower, and still more preferably 1.75 or lower, from the viewpoint of stability when drawing a strand of the methacrylic resin composition discharged from the extruder into a pelletizer to mold the strand into a pellet shape. When the value of $L^A/L^B$ is high, a ratio of the component of the high-molecular-weight component generated in the first reaction tank 10 is increased, such that a load on the extruder may be increased. In addition, when the value of $L^A/L^B$ is low, a ratio of a low-molecular-weight component produced in the second reaction tank 20 is high, and a mechanical strength of the strand is thus low when the strand discharged from the extruder is drawn into the pelletizer to be formed into a pellet shape. Therefore, the strand may be broken and a fine powder may be generated.

A value of $S^B/S^A$ is more preferably 0.6 or higher, and still more preferably 1.0 or higher, but more preferably 2.0 or lower, and still more preferably 1.5 or lower.

It is more preferable that the method of producing a methacrylic resin composition of the present embodiment satisfies the following requirements (13) and (14).

$$30 \leq \theta^1 \leq 70 \quad (13)$$

$$10 \leq \theta^2 \leq 50 \quad (14)$$

In the requirement (13), $\theta^1$ represents a retention time (min) in the first reaction tank 10 in the first polymerization step.

In the requirement (14), $\theta^2$ represents a retention time (min) in the second reaction tank 20 in the second polymerization step.

In the present embodiment, when the method of producing a methacrylic resin composition satisfies the requirements (13) and (14), a methacrylic resin composition capable of obtaining a molded article more excellent in a Charpy impact strength can be produced.

$\theta^1$ is more preferably 30 or more, and still more preferably 35 or more, from the viewpoint of production efficiency, but is more preferably 40 or less, and still more preferably 38 or less, from the viewpoint of stability. The shorter the retention time, the better the stability. When the retention time is too short, a degree of friction in a connection pipe between the first reaction tank 10 and the second reaction tank 20 becomes large, which may cause difficulty in feeding a liquid to the pump.

$\theta^2$ is more preferably 15 or more, and still more preferably 20 or more, from the viewpoint of productivity efficiency, but more preferably 23 or less, from the viewpoint of production stability. The shorter the retention time, the better the production stability.

However, when the retention time is too short, a degree of friction in the connection pipe between the first reaction tank 10 and the second reaction tank 20 becomes large, which may cause difficulty in feeding a liquid by the pump.

In the present embodiment, the method of producing a methacrylic resin composition may include an optional step, in addition to the first polymerization step and the second polymerization step. Examples of the optional step can include a step of removing a volatile component such as an unreacted raw material monomer from the methacrylic resin composition obtained in the second polymerization step, and a step of forming a methacrylic resin composition into any shape such as a pellet shape.

3. Method of Producing Molded Article

The method of producing the molded article of the present embodiment is not particularly limited. Examples of the method of producing the molded article of the present embodiment can include an extrusion molding method and an injection molding method. The molded article of the present embodiment is preferably produced by an injection molding method from the viewpoint of excellent fluidity of the methacrylic resin composition that is a material of the molded article. Hereinafter, as the method of producing the molded article of the present embodiment, a production method by an injection molding method will be described by way of example.

The method of producing the molded article of the present embodiment includes: a step of preparing a methacrylic resin composition containing at least one methacrylic resin; and a step of subjecting the methacrylic resin composition to injection molding under conditions in which an injection temperature is 240° C. to 270° C. and an injection speed is 10 mm/sec to 70 mm/sec to obtain a molded article. Hereinafter, the respective steps will be described in detail.

(1) A Step of Preparing a Methacrylic Resin Composition Containing at Least One Methacrylic Resin This step is a step of preparing a methacrylic resin composition to be fed to an injection molding machine. The "methacrylic resin composition containing at least one methacrylic resin" is as described above, and thus, the detailed description thereof will be omitted.

In the present embodiment, when the molded article is produced by an injection molding method, the methacrylic resin composition is preferably formed into a pellet shape from the viewpoint of further improving production efficiency. The shape, the size, and the like of the pellet-shaped methacrylic resin composition can be set within an arbitrarily suitable range in consideration of an injection molding apparatus to be used and the conditions to be applied.

(2) A Step of Subjecting the Methacrylic Resin Composition to Injection Molding Under Conditions in which an Injection Temperature is 240° C. to 270° C. and an Injection Speed is 10 mm/Sec to 70 mm/Sec to Obtain a Molded Article This step is a step of forming the methacrylic resin composition into a molded article by an injection molding machine.

Specifically, this step is performed by injecting the methacrylic resin composition described above in a molten state into a cavity of a mold provided in the injection molding machine to fill and mold the methacrylic resin composition, cooling the methacrylic resin composition, and then peeling off and taking out a molded article obtained by molding the methacrylic resin composition from the mold.

More specifically, a pellet-shaped methacrylic resin composition is put into a cylinder from a hopper provided in the injection molding machine, the methacrylic resin composition is melted while rotating a screw, the screw is retracted to fill a predetermined amount of the methacrylic resin composition in the cylinder, filling is performed by injecting the molten methacrylic resin composition into the cavity of the mold at a predetermined injection temperature and a predetermined injection speed while applying a pressure by advancing the screw, the pressure is held for a predetermined time until the mold is sufficiently cooled, and then the mold is opened to peel off and take out the molded article from the mold, thereby producing a molded article.

In the present embodiment, it is preferable that injection molding is performed by satisfying the requirements for the pencil hardness and the craze formation time described above under conditions in which an injection temperature is 240° C. to 270° C. and an injection speed of 10 to 70 mm/sec, from the viewpoint of obtaining a molded article excellent in a Charpy impact strength.

In the present embodiment, the injection temperature refers to a "temperature of the methacrylic resin composition (in the molten state) when being injected from a nozzle of the injection molding machine". Specifically, since it is difficult to measure the temperature of the methacrylic resin composition in the nozzle immediately before the injection, a step of injecting the methacrylic resin composition in the molten state from the nozzle of the injection molding machine is repeated three times or more in succession, and a sensor unit of a thermometer immediately inserted into the inside (the second layer) of the methacrylic resin composition mass in which three layers are laminated immediately after the third injection to measure the temperature, thereby using the obtained temperature as an injection temperature.

In the present embodiment, the injection temperature is more preferably 250° C. to 270° C., and still more preferably 250° C. to 260° C., from the viewpoint of obtaining a molded article excellent in a Charpy impact strength.

In the present embodiment, the injection speed refers to a speed (mm/sec) of the methacrylic resin composition (in the molten state) injected from the injection molding machine.

In the present embodiment, the injection speed is more preferably 10 mm/sec to 50 mm/sec, and still more preferably 20 mm/sec to 40 mm/sec, from the viewpoint of obtaining a molded article excellent in a Charpy impact strength.

In the present embodiment, various conditions (conditions excluding the injection temperature and the injection speed described above) when producing the molded article can be appropriately set, but are not particularly limited.

In the present embodiment, a mold temperature (° C.) of the injection molding machine is preferably 50° C. to 80° C., and more preferably 60° C. to 70° C., from the viewpoint of obtaining a molded article excellent in a Charpy impact strength.

In the present embodiment, a cooling time (sec) is a time during which the methacrylic resin composition (in the molten state) filled in the cavity in the mold is cooled by holding the pressure in the mold. The cooling time is preferably 30 to 150 seconds, and more preferably 40 to 60 seconds, from the viewpoint of obtaining a molded article excellent in a Charpy impact strength.

In the present embodiment, an injection time (sec) is a time until the methacrylic resin composition (in the molten state) is injected and the filling into the mold is completed. The injection time is preferably 5 to 15 seconds, and more preferably 8 to 13 seconds, from the viewpoint of obtaining a molded article excellent in a Charpy impact strength.

In the present embodiment, a screw rotational speed (rpm) is a rotational speed of the screw provided in the injection molding machine when the methacrylic resin composition (in the molten state) is injected. The screw rotational speed is preferably 40 to 100 rpm, and more preferably 50 to 60 rpm, from the viewpoint of obtaining a molded article excellent in a Charpy impact strength.

In the present embodiment, a back pressure (MPa) is a pressure in the injection molding machine when the methacrylic resin composition (in the molten state) is injected. The back pressure is preferably 5 to 15 MPa, and more preferably 8 to 13 MPa, from the viewpoint of obtaining a molded article excellent in a Charpy impact strength.

In the present embodiment, a glass transition temperature of the molded article is a glass transition temperature (Tmg) (° C.) measured in accordance with JIS K 7121.

The glass transition temperature can be measured using any suitable measurement apparatus known in the related art (for example, "DSC7020", manufactured by Hitachi High-Tech Science Corporation, which is a differential scanning calorimeter).

Specifically, after the test piece is completely melted under an inert gas atmosphere using a test piece obtained by finely crushing the molded article (injection molded article), the glass transition temperature can be measured on the basis of a DSC curve obtained by a predetermined temperature profile.

In the present embodiment, the glass transition temperature of the molded article is preferably 110° C. to 120° C., and more preferably 110° C. to 115° C.

4. Use of Molded Article

The molded article of the present embodiment is preferably used as a vehicle member such as a tail lamp cover, a head lamp cover, a visor, or a cover of a meter panel, an optical member such as a lens, a display protective plate, an optical film, or a light guide plate, and a member for a cosmetic container. Among them, the molded article can be particularly preferably used as a vehicle member.

EXAMPLES

Hereinafter, embodiments of the present invention will be described in more detail with reference to examples and comparative examples. The present invention is not limited to the following examples.

Preparation Example 1

Preparation of Methacrylic Resin Composition 1

A methacrylic resin composition 1 was prepared using a continuous polymerization apparatus illustrated in FIG. 5. A complete mixing reaction tank having a capacity of 13 L was used as the first reaction tank 10, and a complete mixing reaction tank having a capacity of 8 L was used as the second reaction tank 20.

First Polymerization Step

In the first reaction tank 10, an intermediate composition (A) was prepared from a raw material composition (A).

First, the raw material composition (A) as a raw material monomer solution 1 was prepared as a mixture obtained by mixing 98.44 parts by mass of methyl methacrylate, 1.40 parts by mass of methyl acrylate, 0.146 parts by mass of a chain transfer agent [n-octyl mercaptan, a chain transfer agent (A)], and 0.0142 parts by mass of a polymerization initiator [tert-amyl peroxy-2-ethylhexanoate, a polymerization initiator (A)] with each other, and the first polymerization step was performed.

In the first polymerization step, a flow rate was adjusted so that a retention time ($\theta^1$) of the mixture in the first reaction tank 10 was 37.3 minutes.

In addition, in the first polymerization step, a temperature of the jacket 13 surrounding an outer wall surface of the first reaction tank 10 was adjusted, a temperature (T1) in the first reaction tank 10 was set to 140° C., and continuous bulk polymerization was performed, thereby preparing a syrup 1 containing the intermediate composition (A).

Second Polymerization Step

First, a raw material monomer solution 2 was prepared as a raw material composition (B) fed to the second reaction tank 20.

The raw material monomer solution 2 is a solution prepared by mixing 96.84 parts by mass of methyl methacrylate, 1.4 parts by mass of methyl acrylate, 1.673 parts by mass of a chain transfer agent [n-octyl mercaptan, a chain transfer agent (B)], and 0.0915 parts by mass of a polymerization initiator [1,1-di(tert-butylperoxy)cyclohexane, a polymerization initiator (B)] with each other.

Next, in the feeding of the syrup 1 prepared in the first reaction tank 10 and the raw material monomer solution 2 prepared as described above to the second reaction tank 20, the flow rate was adjusted so that the raw material monomer solution 2 and the syrup 1 were mixed in a mass ratio of 1:10.2.

As described above, the mixture of the raw material monomer solution 2 as the raw material composition (B) and the syrup 1 as the intermediate composition (A) was obtained. A retention time ($\theta^2$) of the mixture in the second reaction tank 20 was 22.3 minutes.

Next, a temperature of the jacket 23 surrounding an outer wall surface of the second reaction tank 20 was adjusted, a temperature (T2) in the second reaction tank 20 was set to 175° C., and continuous bulk polymerization of the mixture was performed, thereby obtaining a syrup 2.

The continuous bulk polymerization was performed in a state in which the first reaction tank 10 was filled with the syrup 1 and the second reaction tank 20 was filled with the mixture (a state of full solution), that is, a state in which substantially no gas phase was present in the first reaction tank 10 and the second reaction tank 20.

Next, the syrup 2 (reaction mixture) in the second reaction tank 20 was continuously extracted from the extraction port 21b positioned at the top of the second reaction tank 20. Next, the extracted syrup 2 was introduced into the pre-heater 31 through the extraction line 25.

Next, the introduced syrup 2 was heated to 200° C. in the pre-heater 31, the heated syrup was introduced into the devolatilization extruder 33 with a vent, and volatile components such as unreacted raw material monomers were removed in the devolatilization extruder 33 with a vent at 250° C., thereby obtaining a methacrylic resin composition 1.

Next, the obtained methacrylic resin composition 1 was extruded in a molten state from the devolatilization extruder 33 with a vent, cooling was performed with water, cutting was performed to form the methacrylic resin composition 1 into a pellet shape, and the methacrylic resin composition was discharged from the discharge line 35, thereby obtaining a pellet-shaped methacrylic resin composition 1.

The pellet-shaped methacrylic resin composition 1 was prepared by the above steps.

Preparation Example 2

Preparation of Methacrylic Resin Composition 2

A pellet-shaped methacrylic resin composition 2 was prepared in the same manner as that of Preparation Example 1 except for the following points.

In the first polymerization step, in the first reaction tank 10, the mixture was obtained by mixing 99.39 parts by mass of methyl methacrylate, 0.50 parts by mass of methyl acrylate, 0.098 parts by mass of n-octyl mercaptan as a chain transfer agent, and 0.0072 parts by mass of t-amyl peroxy-2-ethylhexanoate as a polymerization initiator with each other.

In the first polymerization step, the flow rate was adjusted so that the retention time of the mixture in the first reaction tank 10 was 61.6 minutes.

In the preparation of the raw material monomer solution 2 fed to the second reaction tank 20, the raw material monomer solution 2 was obtained by mixing 94.05 parts by mass of methyl methacrylate, 0.50 parts by mass of methyl acrylate, 5.35 parts by mass of a chain transfer agent [n-octyl mercaptan], and 0.100 parts by mass of a polymerization initiator [1,1-di(tert-butylperoxy)cyclohexane] with each other.

In the second polymerization step, in the second reaction tank 20, when the raw material monomer solution and the syrup 1 were mixed with each other, the flow rate was adjusted so that the raw material monomer solution 2 and the syrup 1 were mixed at a mass ratio of 1:9.7. The retention time of the mixture in the second reaction tank 20 at this time was 36.6 minutes.

Measurement of Content of Methacrylic Acid Ester Structural Unit in Methacrylic Resin Composition A content of a methacrylic acid ester structural unit with respect to a total content of all structural units in a methacrylic resin composition was determined by decomposing the pellet-shaped methacrylic resin composition with a pyrolyzer, analyzing the methacrylic resin composition with a gas chromatography analyzer, and measuring a peak area corresponding to each of a methacrylic acid ester and an acrylic acid ester which were used as monomer components. The pyrolysis conditions in the pyrolyzer and the analysis conditions in the gas chromatography analyzer are as follows.

Pyrolysis Conditions

Sample preparation: The methacrylic resin composition was precisely weighed (2 to 3 mg as a standard) and was put in the central portion of a metal cell formed into a gutter shape, and the metal cell was folded to enclose the methacrylic resin composition by lightly pressing both ends of the metal cell with a plier, thereby preparing a sample.

Pyrolyzer: CURIE POINT PYROLYZER JHP-22 (manufactured by Japan Analytical Industry Co., Ltd.)

Metal cell: Pyrofoil F590 (manufactured by Japan Analytical Industry Co., Ltd.)

Set temperature of constant temperature tank: 200° C.

Set temperature of heat retention pipe: 250° C.

Pyrolysis temperature: 590° C.

Pyrolysis time: 5 sec

Analysis Conditions

Gas chromatography analyzer: GC-14B (manufactured by Shimadzu Corporation)

Detection method: FIL

Column: 7G 3.2 m×3.1 mmφ (manufactured by Shimadzu Corporation)

Fillet: FAL-M (manufactured by Shimadzu Corporation, packed column)

Carrier gas: Air/$N_2$/$H_2$=50/100/50 (kPa), 80 mL/min

Condition for increasing temperature of column: Maintaining temperature at 100° C. for 15 minutes, increasing temperature to 150° C. at a rate of 10° C./min, and then maintaining temperature at 150° C. for 14 minutes Injection temperature: 200° C.

Detection temperature: 200° C.

A peak area (a1) corresponding to the methacrylic acid ester and a peak area (b1) corresponding to the acrylic acid ester when detected under the above pyrolysis conditions and analysis conditions were determined. A peak area ratio A (=b1/a1) was determined using these peak areas (a1) and (b1).

Next, a standard product of a methacrylic resin in which a mass ratio of an acrylic acid ester structural unit to a methacrylic acid ester structural unit was W0 (known) (a mass of the acrylic acid ester structural unit/a mass of the methacrylic acid ester structural unit) was analyzed under the above pyrolysis conditions and analysis conditions to determine a peak area (a0) corresponding to the detected methacrylic acid ester and a peak area (b0) corresponding to the detected acrylic acid ester. A peak area ratio A0 (=b0/a0) was determined using these peak areas (a0) and (b0).

A factor f (=W0/A0) was determined using the peak area ratio A0 and the mass ratio W0.

Next, a mass ratio W of the acrylic acid ester structural unit to the methacrylic acid ester structural unit (the mass of the acrylic acid ester structural unit/the mass of the methacrylic acid ester structural unit) was determined by multiplying the peak area ratio A by the factor f, the acrylic acid ester structural unit and the methacrylic acid ester structural unit being included in the methacrylic resin composition to be measured.

Each of a content (% by mass) of the methacrylic acid ester structural unit and a content (% by mass) of the acrylic acid ester structural unit with respect to a total content of the methacrylic acid ester structural unit and the acrylic acid ester structural unit was calculated using the obtained mass ratio W.

Methods of Evaluating W1, W2, and Mw/Mn

GPC Measurement

The pellet-shaped methacrylic resin composition was analyzed by GPC measurement to determine W1, W2, and Mw/Mn.

The GPC measurement conditions are as follows.

GPC Measurement Conditions

Measurement apparatus: HLC-8320GPC, manufactured by Tosoh Corporation

Column Configuration

Sample column: connecting two columns of TSKgel Super Multipore HZ-M and one column of TSKguard Column Super MP(HZ)-M in series Reference column: connecting two columns of TSKgel Super H-RC in series Detector: reflective index (PI) (differential refractive) detector Calculation method: molecular weight calculation Internal standard: Chloroform was used as an internal standard.

Allowable time at internal standard peak: 0.15 min

Elution time at internal standard peak: An elution time of chloroform at the time of measuring a standard sample for a calibration curve was set.

Reference sample: THF (special grade, manufactured by FUJIFILM Wako Pure Chemical Corporation)

Measurement sample: 25 mg of a methacrylic resin composition was sufficiently dissolved in 5 cc of a THF/chloroform solution in which chloroform (manufactured by FUJIFILM Wako Pure Chemical Corporation) as an internal standard was dissolved in THF (special grade, manufactured by FUJIFILM Wako Pure Chemical Corporation) to 0.04 vol %, thereby preparing a measurement sample.

Column temperature: 40° C.

Injection amount: 10 μL

Pump flow rate of sample: 0.35 mL/min

Pump flow rate of reference: 0.60 mL/min

An RI detection intensity with respect to the elution time of the methacrylic resin composition was measured under the GPC measurement conditions. As a standard sample for creating a calibration curve, the following seven methacrylic resins (Shodex STANDARD M-75, manufactured by Showa Denko K.K.) whose monodisperse mass average molecular weights were known and peak molecular weights were different from each other as shown below were used.

Standard sample 1: peak molecular weight: 1,050,000
Standard sample 2: peak molecular weight: 569,000
Standard sample 3: peak molecular weight: 211,000
Standard sample 4: peak molecular weight: 68,800
Standard sample 5: peak molecular weight: 18,500
Standard sample 6: peak molecular weight: 7,360
Standard sample 7: peak molecular weight: 3,070

The measurement was performed under the same conditions as in the measurement of the methacrylic resin composition described above using the standard sample for creating a calibration curve to determine an elution time at the peak top of each standard sample. The following cubic approximate expression was calculated from the obtained elution time and peak molecular weight and used as a calibration formula when analyzing the measurement results of the methacrylic resin composition.

$$\log M(\text{molecular weight}) = At^3 + Bt^2 + Ct + D$$

A, B, C, D: variables t: elution time

Determination Methods of W1, W2, and Mw/Mn

Mw/Mn was obtained by analyzing the methacrylic resin composition with the GPC measurement as described above. The obtained GPC curve was output at an interval of 500 m/sec of the elution time to create a differential molecular weight distribution curve.

When a point on a low molecular weight side was a point A (starting point) and a point of a high molecular weight side was a point B (end point), among points at which the obtained differential molecular weight distribution curve and the straight line of dW/d (log M)=0 were in contact with each other, in a case where an area surrounded by the curve and the straight line was 100, the calculation was performed by setting a ratio (%) of an area from the starting point to a molecular weight of 30,000 to W1 and setting a ratio (%) of an area from a molecular weight of 300,000 to the end point to W2.

The conditions in Preparation Examples 1 and 2 and the results of the analysis and the measurement of the obtained methacrylic resin composition are shown in Table 1. In Table 1, the abbreviations represent the following meanings.

$L^A$ (% by mass): concentration of polymerization initiator (A) in raw material composition (A)

$L^b$ (% by mass): concentration of polymerization initiator (B) in mixture of raw material composition (B) and intermediate composition (A)

$S^A$ (% by mass): concentration of chain transfer agent (A) in raw material composition (A)

$S^B$ (% by mass): concentration of chain transfer agent (B) in mixture of raw material composition (B) and intermediate composition (A)

$\theta^1$ (min): retention time in first reaction tank in first polymerization step $\theta^2$ (min): retention time in second reaction tank in second polymerization step

TABLE 1

|  | Preparation Example 1 Methacrylic resin composition 1 | Preparation Example 2 Methacrylic resin composition 2 |
|---|---|---|
| $L^A$ (% by mass) | 0.0142 | 0.0072 |
| $L^B$ (% by mass) | 0.0082 | 0.0093 |
| $L^A/L^B$ | 1.73 | 0.77 |
| $S^A$ (% by mass) | 0.146 | 0.098 |
| $S^B$ (% by mass) | 0.150 | 0.500 |
| $S^B/S^A$ | 1.03 | 5.10 |
| $\theta^1$ (min) | 37.3 | 61.6 |
| $\theta^2$ (min) | 22.3 | 36.6 |
| $\theta^1/\theta^2$ | 1.67 | 1.68 |
| Content (% by mass) of methacrylic acid ester structural unit in methacrylic resin composition | 98.6 | 99.5 |
| W1 (%) | 17.6 | 13.8 |
| W2 (%) | 6.1 | 29.7 |
| Mw/Mn | 2.5 | 4.9 |

Examples 1 to 3 and Comparative Examples 1 to 3

Production of Molded Article (Injection Molded Article)

The methacrylic resin composition was pre-dried in an oven under the atmosphere at 80° C. for 12 hours or longer.

Thereafter, injection molding was performed using an injection molding machine ("EC 130 SXII-4A" with hopper and heaters HN, H1, H2, and H3, manufactured by Toshiba Machine Co., Ltd.) to obtain an injection molded article. The injection conditions are as shown in Table 2. In addition, the meanings of the terms in Table 2 are as follows.

Injection temperature (° C.): temperature of methacrylic resin composition (molten state) injected from injection molding machine Mold temperature (° C.): temperature of mold Injection speed (mm/sec): speed of methacrylic resin composition (molten state) injected from injection molding machine Cooling time (sec): time for holding and cooling methacrylic resin composition (molten state) in mold Injection time (sec): time until methacrylic resin composition (molten state) is injected and filling into mold is completed Screw rotational speed (rpm): rotational speed of screw provided in injection molding machine when methacrylic resin composition (molten state) is injected Back pressure (MPa): pressure in injection molding machine when methacrylic resin composition (molten stat) is injected Method of Measuring Injection Temperature Using an injection molding machine ("EC 130 SXII-4A", manufactured by Toshiba Machine Co., Ltd.), the step of injecting the methacrylic resin composition (in the molten state) was repeated three times under injection molding conditions theaters HN, H1, H2, and H3 and temperature (° C.) under hopper, injection temperature (° C.) of methacrylic resin composition, a mold temperature (° C.), an injection speed (mm/sec), a cooling time (sec), an injection time (sec), a screw rotational speed (rpm), and a back pressure (MPa)) shown in Table 2.

Here, the heaters HN, H1, H2, and H3 were arranged so as to be adjacent to each other in this order from the injection port toward the bottom of the hopper. In addition, the separation distance from the injection port to the heater HN was about 5 cm, and the separation distance from the heater H3 to the bottom of the hopper was about 15 cm.

A sensor unit of a thermometer (Handy-type temperature measuring instrument HD-1200E and temperature sensor BS-91E-010-TS1-ASP, manufactured by Anritsu Meter Co., Ltd.) was immediately inserted into the lump immediately after the third injection of the obtained methacrylic resin composition, and the obtained value was taken as the injection temperature. This is because the temperature of the methacrylic resin composition (in the molten state) injected from the injection molding machine is maintained in the lump of the methacrylic resin composition.

TABLE 2

|  | Example 1 | Example 2 | Comparative Example 1 | Example 3 | Comparative Example 2 | Comparative Example 3 |
|---|---|---|---|---|---|---|
| Methacrylic resin composition | Methacrylic resin composition 1 | Methacrylic resin composition 1 | Methacrylic resin composition 1 | Methacrylic resin composition 2 | Methacrylic resin composition 2 | Methacrylic resin composition 2 |
| HN (° C.) | 235 | 235 | 265 | 235 | 265 | 265 |
| H1 (° C.) | 240 | 240 | 270 | 240 | 270 | 270 |
| H2 (° C.) | 240 | 240 | 270 | 240 | 270 | 270 |
| H3 (° C.) | 230 | 230 | 230 | 230 | 230 | 230 |
| Under hopper (° C.) | 60 | 60 | 60 | 60 | 60 | 60 |
| Injection temperature (° C.) of methacrylic resin composition | 256 | 256 | 275 | 260 | 276 | 276 |
| Mold temperature (° C.) | 60 | 60 | 60 | 60 | 60 | 60 |
| Injection speed (mm/sec) | 30 | 30 | 30 | 30 | 30 | 30 |
| Cooling time (sec) | 30 | 150 | 30 | 150 | 30 | 150 |

TABLE 2-continued

|  | Example 1 | Example 2 | Comparative Example 1 | Example 3 | Comparative Example 2 | Comparative Example 3 |
|---|---|---|---|---|---|---|
| Injection time (sec) | 10 | 10 | 10 | 10 | 10 | 10 |
| Screw rotational speed (rpm) | 50 | 50 | 50 | 50 | 50 | 50 |
| Back pressure (MPa) | 10 | 10 | 10 | 10 | 10 | 10 |

Method of Evaluating Craze Formation Time

A test piece that was a strip-shaped (rectangular parallelepiped) injection molded article (molded article) whose length ($L_1$) in a longitudinal direction was 174 mm, length (width W) in a transverse direction orthogonal to the longitudinal direction was 25.4 mm, and length (thickness T) in a thickness direction orthogonal to both the longitudinal direction and the transverse direction was 3 mm was prepared. At this time, the test piece was cut out so that the longitudinal direction of the test piece coincided with the injection direction (MD) of the methacrylic resin composition.

A cylindrical through-hole having a diameter D of 6 mm was formed in the thickness direction with a point separated by 10 mm L) in the longitudinal direction from one edge of the longitudinal direction of the test piece and separated by 12.7 mm (Wa) from one edge of the transverse direction of the test piece as the central axis.

Next, the test piece was heated (annealed) and dried at 80° C. for 7 hours using a hot air circulation oven. The test piece immediately after drying was stored in a desiccator containing a desiccant for 16 hours.

The following test was performed using the test piece treated as described above. The test was performed in a constant temperature and constant humidity chamber of temperature: 23° C./relative humidity: 50%. A cantilever method was adopted as a test method, and the test was performed by the following procedures (a) to (c).

(a) A range separated by 100 mm to 130 mm in the longitudinal direction from the edge of the longitudinal direction closer to the through-hole of the upper surface and the lower surface facing each other that were main surfaces defined by a long side ($L_1$) extending in the longitudinal direction of the test piece and a short side (W) extending in the transverse direction of the test piece was clamped to fix the test piece to a fixing table so that the extending directions of the upper surface and the lower surface coincided with the horizontal direction.

Ethanol ("Reagent first grade ethanol", manufactured by Wako Pure Chemical Industries, Ltd.) was applied one or more times in a belt shape to the upper surface of the range (application region) (that is, a distance L) between the central axis C of the through-hole of the test piece and the center of the ethanol application region of the test piece was 85 mm) separated by 90 nm to 100 mm in the longitudinal direction from the edge of the longitudinal direction closer to the through-hole of the test piece. Specifically, the ethanol was periodically repeatedly applied a plurality of times while maintaining a state in which the ethanol was applied so that the ethanol applied in the band shape was not volatilized and eliminated.

(b) A wire-shaped member having one end fixed to a locking member locked to the upper surface and the other end fixed to a load member passed through the through-hole to suspend the load member at a position in which the through-hole was provided in the test piece, thereby applying a load of 800 g in a vertical direction. Therefore, a predetermined surface stress was generated to the ethanol application region of the upper surface of the test piece.

(c) A time (sec) from the start of the application of the ethanol to the formation of the craze in the test piece was measured as a craze formation time (sec). As described above, the "craze formation time" was measured. The results are shown in Table 3.

Method of Evaluating Pencil Hardness

A strip-shaped (rectangular parallelepiped) injection molded article whose length in a transverse direction was 30 mm, length in a longitudinal direction orthogonal to the transverse direction was 100 mm, and length in a thickness direction orthogonal to both the longitudinal direction and the transverse direction was 3 mm was prepared as a test piece. At this time, the test piece was cut out 30 that the transverse direction of the test piece coincided with the injection direction (MD) of the methacrylic resin composition.

The obtained test piece was subjected to a test under conditions in which a load was 750 g and a scratch speed was 0.5 mm/sec using an electric pencil scratch hardness tester ("553 M1", manufactured by Yasuda Seiki Seisakusho Ltd.) according to a measurement method specified in JIS K 5600 to measure a pencil hardness.

The test was performed three times using a pencil ("uni", manufactured by MITSUBISHI PENCIL CO., LTD.) having hardnesses arranged so that the pencil lead was cylindrical, and whether or not streaky scratches were generated on the surface of the test piece was visually observed and evaluated according to the following criteria. The surface of the test piece was visually observed in a room, and the test piece was lifted up to confirm the presence or absence of the streaky scratch while irradiating the test piece with light in indoor lighting and changing an inclination of the test piece.

Criteria

Good (○): No scratches were observed on the surface of the test piece or scratches were observed only once in the test performed three times.

Poor (×): Scratches were observed twice or three times on the surface of the test piece in the test performed three times.

Among the hardnesses of the pencil lead evaluated as good (○), the highest hardness was defined as the pencil hardness of the test piece. The results are shown in Table Method of Measuring Glass Transition Temperature A glass transition temperature (Tmg) (° C.) was measured in accordance with JIS K 7121 using a test piece obtained by finely crushing an injection molded article.

Specifically, a differential scanning calorimeter ("DSC 7020", manufactured by Hitachi High-Tech Science Corporation) was used as a measurement apparatus, and a nitrogen gas flow rate was set to 50 mL/min. After the temperature was increased from room temperature (23° C.) to 150° C. at a rate of 20° C./min (primary temperature increase), the temperature was held at 150° C. for 5 minutes, and the test piece was completely melted, the temperature was decreased from 150° r to −35° C. at a rate of 10° C./min, the temperature was held at −35° C. for 1 minute, and the temperature was increased again to 210° C. at a rate of 10° C./min (secondary temperature increase).

In the DSC curve obtained by the above temperature profile, an intersection (midpoint glass transition temperature) between a stepwise change partial curve at the time of the secondary temperature increase and a straight line equidistant from two base line extended lines in the vertical axis direction was defined as a glass transition temperature (Tmg) (° C.). Two points per test piece were measured to calculate the average value, and the average value was defined as the glass transition temperature. The results are shown in Table 3.

Method of Evaluating Charpy Impact Strength

An injection molded article whose length in a longitudinal direction was 80 mm, length in a transverse direction orthogonal to the longitudinal direction was 10 mm, and length in a thickness direction orthogonal to both the longitudinal direction and the transverse direction was 3 mm was prepared as a test piece. At this time, the test piece was cut out so that the longitudinal direction coincided with the injection direction (MD) of the methacrylic resin composition, and the cut surface generated by the cutting was mirror-polished.

A test was performed six times for each of the examples and the comparative examples under the following conditions using the obtained test piece, an average value was calculated, and the obtained value was defined as a Charpy impact strength (kJ/m$^2$). The results are shown in Table 3.

Test apparatus: IMPACT TESTER, manufactured by Yasuda Seiki Seisakusho, Ltd.

Hammer: 1 J (ii) W2 is 5 to 35, in which W2 is a percentage (%) of a peak area from a molecular weight of 300,000 to the end point to the peak area from the starting point to the end point in the differential molecular weight distribution curve of the methacrylic resin composition; and (iii) a ratio (Mw/Mn) of a mass average molecular weight of the methacrylic resin composition to a number average molecular weight of the methacrylic resin composition is 2.0 to 6.0;

wherein an injection temperature of the molded article is 240° C. to 270° C., and wherein the molded article exhibits a pencil hardness of 2 H, and a craze formation time of 19 seconds or longer, the craze formation time being measured by sequentially performing the following steps 1) to 5):

1) Forming a test piece from the molded article, wherein the test piece is a strip-shaped and has a through-hole provided on a first end side in a longitudinal direction;

2) heating and drying the test piece at 80° C. for 7 hours;

3) Clamping a second end side of the test piece in the longitudinal direction and fixing the test piece to a fixing table so that extending directions of an upper surface and a lower surface of the test piece coincide with a horizontal direction;

4) applying ethanol to a predetermined region of the upper surface such that ethanol is not volatilized from the surface while generating a surface stress on the upper surface by applying a load calculated by the following Equation (1) in a vertical direction at a position where the through-hole of the test piece is provided, and maintaining a state in which the ethanol is applied, $$Wt = (1{,}785 \times W \times T_1^2)/(6 \times L_3) \quad (1)$$

TABLE 3

|  | Example 1 | Example 2 | Comparative Example 1 | Example 3 | Comparative Example 2 | Comparative Example 3 |
| --- | --- | --- | --- | --- | --- | --- |
| Methacrylic resin composition | Methacrylic resin composition 1 | | | Methacrylic resin composition 2 | | |
| Pencil hardness | 2 H | 2 H | 2 H | 2 H | H | H |
| Craze formation time (sec) | 20.6 | 19.5 | 6.2 | 25.8 | 11.9 | 21.9 |
| Glass transition temperature (° C.) | 113 | 112 | 112 | 112 | 112 | 109 |
| Charpy impact strength (kJ/m$^2$) | 25 | 25 | 20 | 23 | 20 | 16 |

What is claimed is:

1. A molded article comprising a methacrylic resin composition comprising at least one methacrylic resin, wherein the methacrylic resin composition satisfies the following requirements (i) to (iii):

(i) W1 is 13 to 17.6, in which W1 is a percentage (%) of a peak area from a starting point to a molecular weight of 30,000 to a peak area from the starting point to an end point in a differential molecular weight distribution curve of the methacrylic resin composition;

wherein,

Wt represents the load (g) applied in the vertical direction at the position where the through-hole of the test piece is provided, W represents a length (mm) of the test piece in a transverse direction, $T_1$ represents a length (mm) of the test piece in a thickness direction, and $L_3$ represents a distance (mm) between a central axis of the through-hole of the test piece and the center of the predetermined region of the test piece to which the ethanol is applied; and 5) Obtaining the craze formation time by measuring a time from the start of the application of the ethanol to the formation of the craze in the test piece.

2. The molded article according to claim 1, wherein the craze formation time is 19 seconds or longer and 54 seconds or shorter.

3. The molded article according to claim 1, wherein the methacrylic resin composition comprises two methacrylic resins.

4. The molded article according to claim 3,
wherein the two methacrylic resins comprise
a methacrylic resin (A) having a mass average molecular weight of 120,000 to 180,000 and
a methacrylic resin (B) having a mass average molecular weight of 10,000 to 60,000 wherein the methacrylic resin (A) is present in 25% by mass to 35% by mass and the methacrylic resin (B) is present in 65% by mass to 75% by mass based on 100% by mass of a total content of the methacrylic resin (A) and the methacrylic resin (B).

5. The molded article according to claim 1,
wherein the at least one methacrylic resin has a structural unit derived from a methacrylic acid ester, and
a content of the structural unit derived from the methacrylic acid ester is 98.0% by mass or more with respect to 100% by mass of a total content of all structural units included in the methacrylic resin composition.

6. The molded article according to claim 5, wherein the methacrylic acid ester is methyl methacrylate.

7. The molded article according to claim 1, wherein the at least one methacrylic resin further has a structural unit derived from an acrylic acid ester.

8. The molded article according to claim 7, wherein the acrylic acid ester is methyl acrylate.

9. A vehicle member formed of the molded article according to claim 1.

10. A method of producing the molded article according to claim 1, the method comprising:
preparing a methacrylic resin composition comprising at least one methacrylic resin; and
subjecting the methacrylic resin composition to injection molding under conditions in which an injection temperature is 240° C. to 270° C. and an injection speed is 10 mm/sec to 70 mm/sec to obtain a molded article.

* * * * *